(12) United States Patent
Brunet et al.

(10) Patent No.: US 8,847,898 B2
(45) Date of Patent: Sep. 30, 2014

(54) SIGNAL-TO-NOISE RATIO IN TOUCH SENSORS

(75) Inventors: Samuel Brunet, Cowes (GB); Vemund Kval Bakken, Menlo Park, CA (US); Richard Paul Collins, Southampton (GB); Yen Goh, Southampton (GB)

(73) Assignee: Atmel Corporation, San Jose, CA (US)

( * ) Notice: Subject to any disclaimer, the term of this patent is extended or adjusted under 35 U.S.C. 154(b) by 141 days.

(21) Appl. No.: 13/226,848

(22) Filed: Sep. 7, 2011

(65) Prior Publication Data

US 2013/0057480 A1    Mar. 7, 2013

(51) Int. Cl.
 G09G 5/00       (2006.01)
 G06F 3/044      (2006.01)
 G06F 3/041      (2006.01)

(52) U.S. Cl.
 CPC .............. *G06F 3/044* (2013.01); *G06F 3/0416* (2013.01)
 USPC ........................................................ 345/173

(58) Field of Classification Search
 CPC ...... G06F 3/0416; G06F 3/044; G06F 3/0488
 USPC ................................................. 345/173–176
 See application file for complete search history.

(56) References Cited

U.S. PATENT DOCUMENTS

| | | | |
|---|---|---|---|
| 5,374,787 A | 12/1994 | Miller et al. | |
| 6,825,833 B2 | 11/2004 | Mulligan et al. | |
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 8,237,667 B2 | 8/2012 | Krah | |
| 2006/0097991 A1* | 5/2006 | Hotelling et al. | 345/173 |
| 2008/0158167 A1* | 7/2008 | Hotelling et al. | 345/173 |
| 2008/0158173 A1* | 7/2008 | Hamblin et al. | 345/173 |
| 2008/0158183 A1* | 7/2008 | Hotelling et al. | 345/173 |
| 2008/0204422 A1 | 8/2008 | Moon et al. | |
| 2008/0309627 A1* | 12/2008 | Hotelling et al. | 345/173 |
| 2008/0309635 A1 | 12/2008 | Matsuo | |
| 2009/0189867 A1 | 7/2009 | Krah et al. | |
| 2009/0219257 A1* | 9/2009 | Frey et al. | 345/173 |
| 2009/0315854 A1 | 12/2009 | Matsuo | |
| 2010/0059295 A1 | 3/2010 | Hotelling et al. | |
| 2010/0060591 A1 | 3/2010 | Yousefpor et al. | |

(Continued)

FOREIGN PATENT DOCUMENTS

WO   WO 2009/107415   9/2009
WO   WO 2012/129247   9/2012

OTHER PUBLICATIONS

U.S. Appl. No. 61/454,936, filed Mar. 21, 2011, Myers.
U.S. Appl. No. 61/454,950, filed Mar. 21, 2011, Lynch.

(Continued)

*Primary Examiner* — Viet Pham
(74) *Attorney, Agent, or Firm* — Baker Botts LLP

(57) ABSTRACT

In one embodiment, a method includes driving at least two of multiple drive lines of a touch sensor at a time, each with one or more electrical pulses.

24 Claims, 4 Drawing Sheets

(56) References Cited

U.S. PATENT DOCUMENTS

| | | |
|---|---|---|
| 2011/0043478 A1 | 2/2011 | Matsushima |
| 2011/0095991 A1 | 4/2011 | Philipp et al. |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |

OTHER PUBLICATIONS

U.S. Appl. No. 61/454,894, filed Mar. 21, 2011, Rothkopf.

H. Philipp et al., U.S. Appl. No. 12/605,068, Non-final Office Action, Jan. 20, 2012.

H. Philipp et al., U.S. Appl. No. 12/605,068, Response Non-final Office Action, Jun. 20, 2012.

H. Philipp et al., U.S. Appl. No. 12/605,068, Final Office Action, Aug. 22, 2012.

H. Philipp et al., U.S. Appl. No. 12/605,068, Request for Continued Examination and Amendment, Dec. 23, 2012.

H. Philipp et al., U.S. Appl. No. 12/605,068, Non-final Office Action, Feb. 13, 2013.

H. Philipp et al., U.S. Appl. No. 12/605,068, Response to Non-final Office Action, Jun. 13, 2013.

H. Philipp et al., U.S. Appl. No. 12/605,068, Non-final Office Action, Aug. 7, 2013.

H. Philipp et al., U.S. Appl. No. 12/605,068, Response to Non-final Office Action, Nov. 7, 2013.

H. Philipp et al., U.S. Appl. No. 12/605,068, Final Office Action, Jan. 7, 2014.

H. Philipp et al., U.S. Appl. No. 12/605,068, Applicant Initiated Interview Summary, Apr. 17, 2014.

H. Philipp et al., U.S. Appl. No. 12/605,068, Request for Continued Examination and Amendment, May 7, 2014.

* cited by examiner

SIGNAL-TO-NOISE RATIO IN TOUCH SENSORS

TECHNICAL FIELD

This disclosure generally relates to touch sensors.

BACKGROUND

A touch sensor may detect the presence and location of a touch by or the proximity of an object (such as a user's finger or a stylus) within a display area of the touch sensor overlaid, for example, on a display screen. Herein, reference to a touch sensor may encompass a position sensor or tactile sensor, and vice versa, where appropriate. In a touch-sensitive display application, the touch sensor may enable a user to interact directly with what is displayed on the screen, rather than indirectly with a mouse or touchpad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are different types of touch sensors, such as (for example) resistive touch screens, surface acoustic wave touch screens, and capacitive touch screens. Herein, reference to a touch sensor may encompass a touch screen, and vice versa, where appropriate. A capacitive touch screen may include an insulator coated with a substantially transparent conductor in a particular pattern. When an object touches or comes within proximity of the surface of the capacitive touch screen, a change in capacitance may occur within the touch screen at the location of the touch or proximity. A controller may process the change in capacitance to determine its position on the touch screen.

DESCRIPTION OF EXAMPLE EMBODIMENTS

Figure 1:
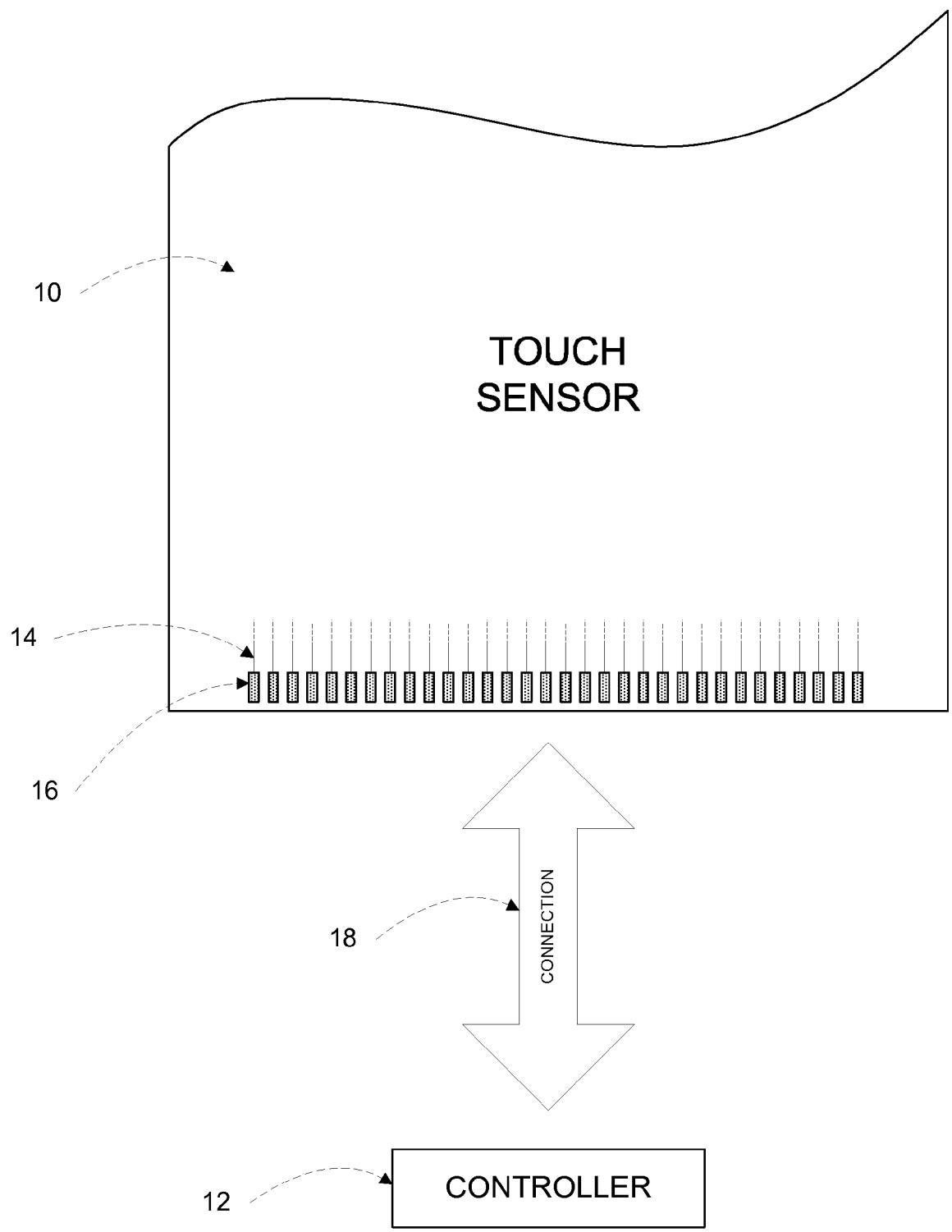
FIG. 1 illustrates an example touch sensor and example controller.

FIG. 1 illustrates an example touch sensor 10 with an example controller 12. Touch sensor 10 and controller 12 may detect the presence and location of a touch by or the proximity of an object within a touch-sensitive area of touch sensor 10. Touch sensor 10 may include one or more touch-sensitive areas, where appropriate. Touch sensor 10 may include an array of drive and sense electrodes (or an array of electrodes of a single type (e.g. drive)) disposed on a substrate, which may be a dielectric material. One or more portions of the substrate may be made of polyethylene terephthalate (PET) or another suitable material. This disclosure contemplates any suitable substrate with any suitable portions made of any suitable material. The drive and sense electrodes in touch sensor 10 may be made of fine lines of metal or other conductive material. As an example and not by way of limitation, one or more portions of the conductive material may be copper or copper-based and have a thickness of approximately 2 μm and a width of approximately 10 μm or less. As another example, one or more portions of the conductive material may be silver or silver-based and have a thickness of approximately 5 μm or less and a width of approximately 10 μm or less. In particular embodiments, the drive and sense electrodes in touch sensor 10 may be made of indium tin oxide (ITO) in whole or in part in addition or as an alternative to fine lines of metal or other conductive material. This disclosure contemplates any suitable electrodes made of any suitable material.

A mechanical stack may contain the substrate (or multiple substrates) and the conductive material forming the drive and sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive and sense electrodes. The mechanical stack may also include a second layer of OCA and another substrate layer (which may be made of PET or another suitable material). The second layer of OCA may be disposed between the substrate with the conductive material making up the drive and sense electrodes and the other substrate layer, and the other substrate layer may be disposed between the second layer of OCA and an airgap to a display of a device including touch sensor 10 and controller 12. As an example only and not by way of limitation, the cover panel may have a thickness of approximately 1 mm; the first layer of OCA may have a thickness of approximately 0.05 mm; the substrate with the conductive material forming the drive and sense electrodes may have a thickness of approximately 0.05 mm (including the conductive material forming the drive and sense electrodes); the second layer of OCA may have a thickness of approximately 0.05 mm; and the other layer of substrate disposed between the second layer of OCA and the airgap to the display may have a thickness of approximately 0.5 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by controller 12) may induce a charge on the sense electrode, and the amount of charge induced may be susceptible to external influence (such as a touch by or the proximity of an object). When an object touches or comes within proximity of the capacitive node, a change in capacitance may occur at the capacitive node and controller 12 may measure the change in capacitance. By measuring changes in capacitance throughout the array, controller 12 may determine the position of the touch or proximity within the touch-sensitive area(s) of touch sensor 10.

In a self-capacitance implementation, touch sensor 10 may include an array of electrodes of a single type (e.g. drive) that may each form a capacitive node. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing, where appropriate.

Touch sensor 10 may have a single-layer configuration, with drive and sense electrodes disposed in a pattern on one side of a substrate. In such a configuration, a pair of drive and sense electrodes capacitively coupled to each other across a space between them may form a capacitive node. In a single-layer configuration for a self-capacitance implementation, electrodes of only a single type (e.g. drive) may be disposed in a pattern on one side of the substrate. As an alternative to a single-layer configuration, touch sensor 10 may have a two-layer configuration, with drive electrodes disposed in a pattern on one side of a substrate and sense electrodes disposed in a pattern on another side of the substrate. In such a configuration, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across the substrate at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Controller 12 may detect and process the change in capacitance to determine the presence and location of the touch or proximity input. Controller 12 may then communicate information about the touch or proximity input to one or more other components (such one or more central processing units (CPUs) or digital signal processors (DSPs)) of a device that includes touch sensor 10 and controller 12, which may respond to the touch or proximity input by initiating a function of the device (or an application running on the device) associated with it. Although this disclosure describes a particular controller having particular functionality with respect to a particular device and a particular touch sensor, this disclosure contemplates any suitable controller having any suitable functionality with respect to any suitable device and any suitable touch sensor.

Controller 12 may be one or more integrated circuits (ICs)—such as for example general-purpose microprocessors, microcontrollers, programmable logic devices or arrays, application-specific ICs (ASICs)—on a flexible printed circuit (FPC) bonded to the substrate of touch sensor 10, as described below. Controller 12 may include a processor unit, a drive unit, a sense unit, and a storage unit. The drive unit may supply drive signals to the drive electrodes of touch sensor 10. As described more fully below, controller 12 may supply drive signals to the drive electrodes of touch sensor 10 as a sequence of drive pulses that drive multiple (e.g. two) "lines" of drive electrodes at a time. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular controller having a particular implementation with particular components, this disclosure contemplates any suitable controller having any suitable implementation with any suitable components.

Tracks 14 of conductive material disposed on the substrate of touch sensor 10 may couple the drive and sense electrodes of touch sensor 10 to bond pads 16, also disposed on the substrate of touch sensor 10. As described below, bond pads 16 facilitate coupling of tracks 14 to controller 12. Tracks 14 may extend into or around (e.g. at the edges of) the touch-sensitive area(s) of touch sensor 10. Particular tracks 14 may provide drive channels for coupling controller 12 to drive electrodes of touch sensor 10, through which the drive unit of controller 12 may supply drive signals to the drive electrodes. Other tracks 14 may provide sense channels for coupling controller 12 to sense electrodes of touch sensor 10, through which the sense unit of controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material or tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector at an edge of the substrate of touch sensor 10 (similar to tracks 14).

Bond pads 16 may be located along one or more edges of the substrate, outside the touch-sensitive area(s) of touch sensor 10. As described above, controller 12 may be on an FPC. Bond pads 16 may be bonded to the FPC using an anisotropic conductive film (ACF). Connection 18 may include conductive lines on the FPC coupling controller 12 to bond pads 16, in turn coupling controller 12 to tracks 14 and to the drive and sense electrodes of touch sensor 10. This disclosure contemplates any suitable connection 18 between controller 12 and touch sensor 10.

Figure 2:
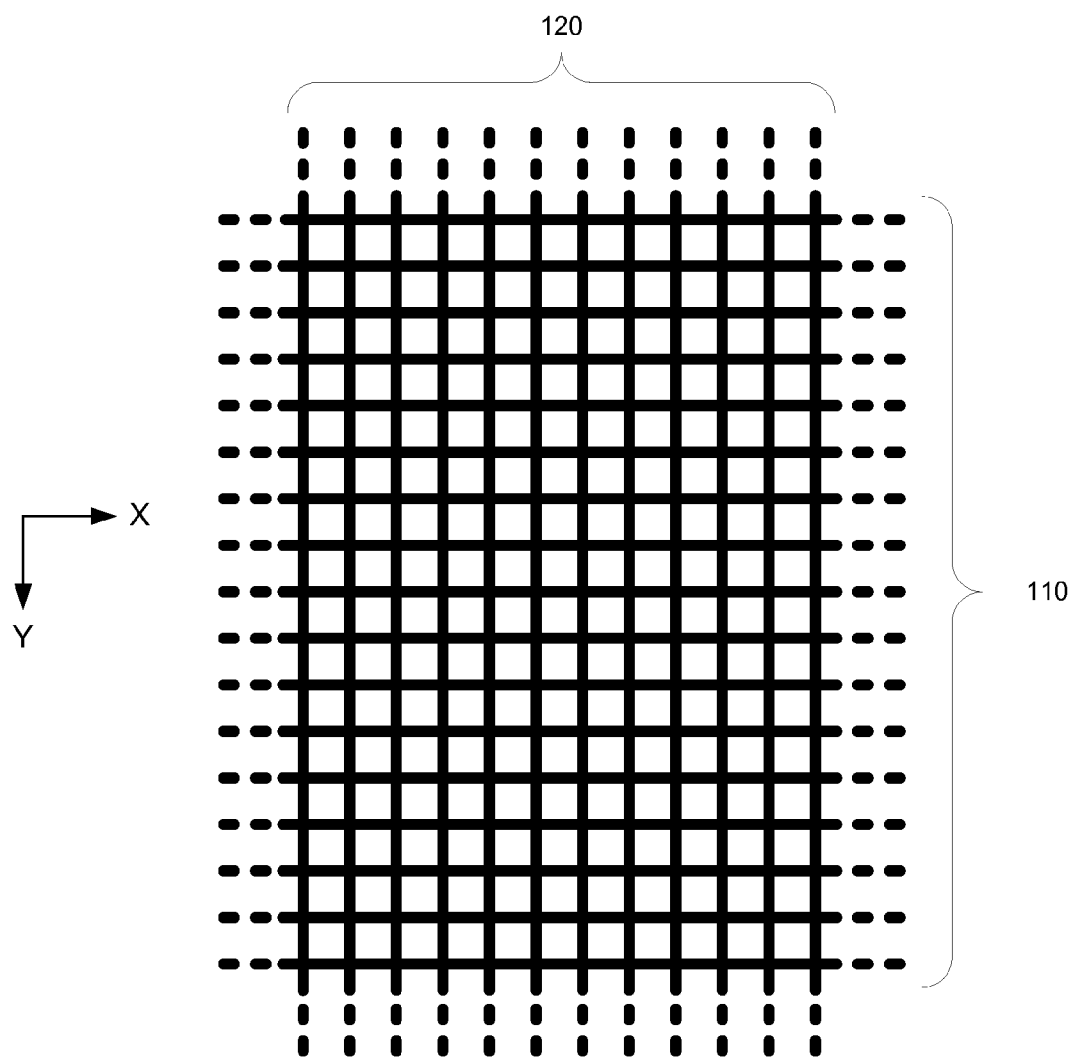
FIG. 2 illustrates a top view of an example layer of example drive lines and an example layer of example sense lines.

FIG. 2 illustrates a top view of an example layer of example drive lines 110 and an example layer of example sense lines 120. Drive lines 110 may generally extend in the X direction, and sense lines 120 may generally extend in the Y direction (perpendicular to the X direction). One or more drive electrodes may form each drive line, and one or more sense electrodes may form each sense line. A mechanical stack may include drive and sense lines 110 and 120. This disclosure contemplates any suitable mechanical stack including suitable drive and sense lines. As an example, drive lines 110 may be disposed on one side of a substrate in the mechanical stack and sense lines 120 may be disposed on another side of the substrate. As another example, drive and sense lines 110 and 120 may both be disposed on the same side of a substrate in the mechanical stack. This disclosure contemplates any suitable arrangement of drive and sense lines in any suitable mechanical stack.

Although this disclosure describes and illustrates drive and sense lines 110 and 120 as straight, continuous lines running perpendicular to each other, this disclosure contemplates drive and sense lines 110 and 120 having any suitable configuration including any suitable shapes with any suitable macro-features and any suitable micro-features. As an example and not by way of limitation, drive and sense lines 110 and 120 may include drive and sense electrodes having disc, square, or rectangle shapes forming a diamond, snowflake, triangle, or bar pattern or a suitable combination of such patterns. In addition, drive lines 110 and sense lines 120 may be interdigitated with each other. The shapes of the drive and sense electrodes may have a solid fill (made of ITO for example) or a mesh fill (made of, for example, fine lines of metal or other conductive material occupying approximately 5% (or less) of the area of the shapes). Although this disclosure describes particular fills for particular shapes for particular drive and sense electrodes, this disclosure contemplates any suitable fill for any suitable shape for any suitable drive or sense electrode.

Figure 3:
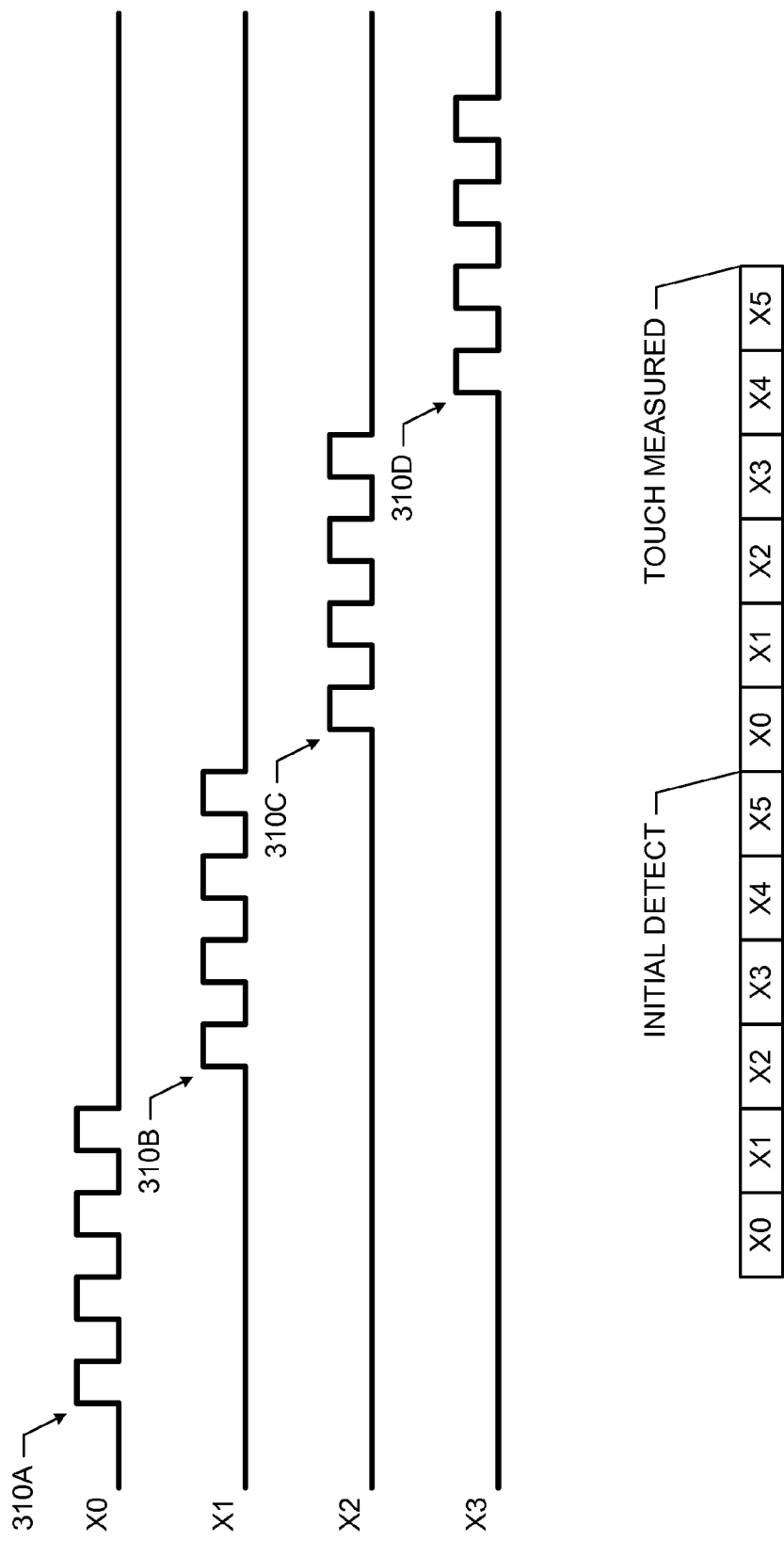
FIG. 3 illustrates an example sequence of electrical pulses for driving one drive line at a time.

FIG. 3 illustrates an example sequence of electrical pulses for driving one drive line at a time. A controller (such as controller 12 in FIG. 1) may send the electrical pulses (or drive pulses), and each of the electrical pulses may have a voltage level associated with it. To simplify this discussion, FIG. 3 illustrates only four drive lines X0, X1, X2, and X3. However, this disclosure contemplates any suitable touch sensor with any suitable number of drive lines. In the example of FIG. 3, drive lines X0, X1, X2, and X3 are driven one at a time and any suitable number of electrical pulses (e.g. two, three, four, or five pulses) may be used to drive each drive line. For example, four electrical pulses 310A may drive line X0; four electrical pulses 310B may then drive line X1; four electrical pulses 310C may then drive line X2; and four electrical pulses 310D may then drive line X3. This process may repeat until reaching the last one of the drive lines (e.g. drive line X3) and then start again with the first one of the drive lines (e.g. drive line X0). As each drive line is driven, a corresponding sense line (not shown in FIG. 3) may be measured to determine whether a touch or proximity input has occurred and, if so, its position.

In a touch sensor, various types of electrical noise may interfere with measurement of touch or proximity signals. For example, when an object touches or comes within proximity of the surface of a touch screen, the object may cause common-mode noise. As another example, there may be electrical noise resulting from a display underlying the touch sensor. The accuracy of the measurements may depend on or be affected by the signal-to-noise ratio (SNR or S/N) of the touch sensor, which may in turn depend on the voltage level of the pulses that drive the drive lines and the noise generated by various sources.

To improve the SNR in a touch sensor, and thus improve the accuracy of the measurements of touch or proximity signals, particular embodiments may drive multiple drive lines at a time, instead of one drive line at a time. Any suitable number of drive lines may be driven at a time. For example, two, three, or four drive lines may be driven at a time.

Figure 4:
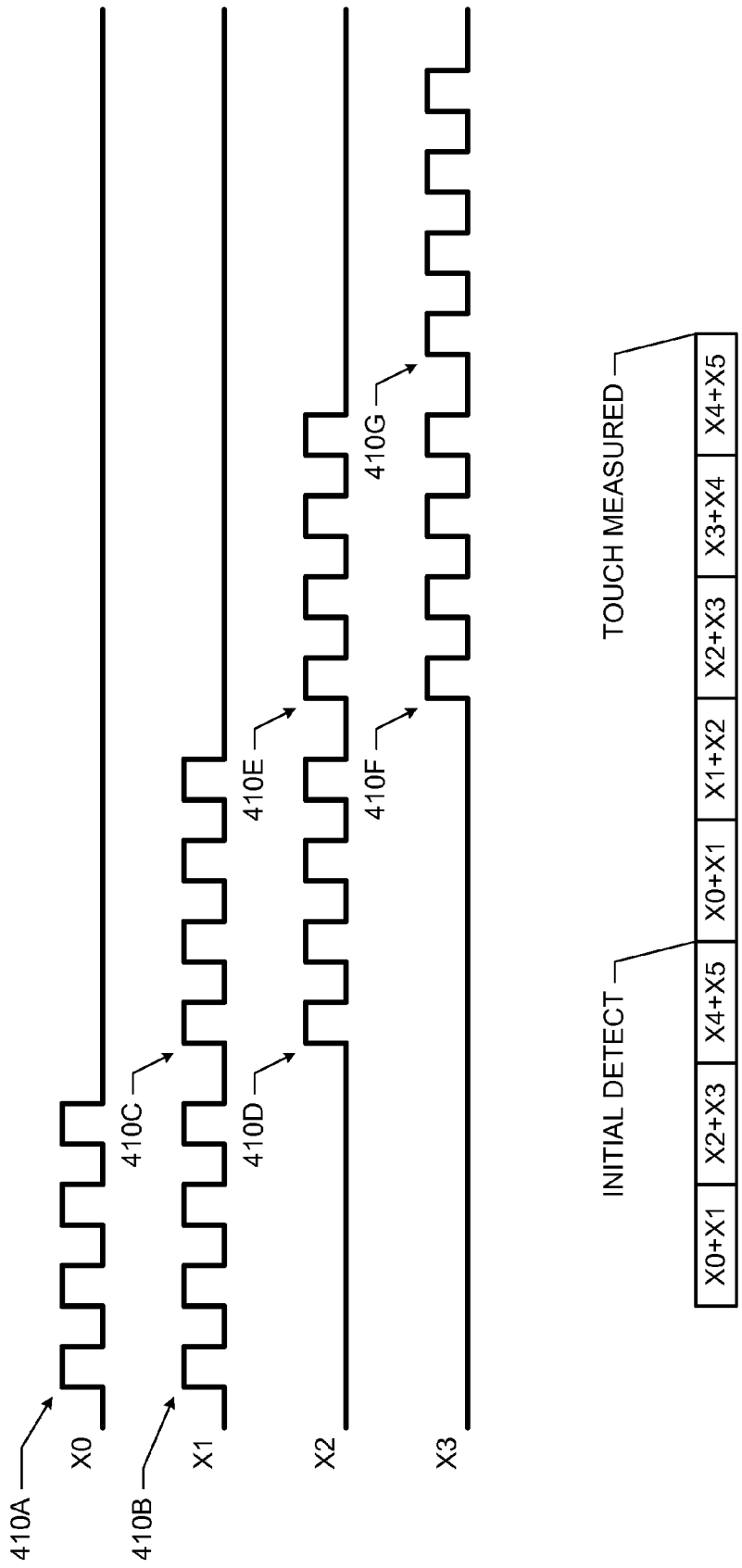
FIG. 4 illustrates an example sequence of drive pulses for driving multiple drive lines at a time.

FIG. 4 illustrates an example sequence of drive pulses for driving multiple (e.g. two) drive lines at a time. A controller (such as controller 12 in FIG. 1) may send the drive pulses, and each of the electrical pulses may have a voltage level associated with it. To simplify this discussion (as with FIG. 3), FIG. 4 illustrates only four drive lines X0, X1, X2, and X3. However, this disclosure contemplates any suitable touch sensor with any suitable number of drive lines. Two or more of drive lines X0, X1, X2, and X3 may be driven at a time, and any number of electrical pulses (e.g. two, three, four, or five pulses) may be used to drive each drive line X0, X1, X2, and X3. In the example of FIG. 4, drive lines X0 and X1 are driven at the same time, each with four electrical pulses 410A and 410B; drive lines X1 and X2 are then driven at the same time, each with four electrical pulses 410C and 410D; drive lines X2 and X3 are then driven at the same time, each with four electrical pulses 410E ad 410F; and drive line X3 and a subsequent drive line (e.g. drive line X4 (not shown in FIG. 4) are driven at the same time, each with four electrical pulses. This process may repeat until reaching the last two drive lines (drive line X3 and a subsequent drive line, such as drive line X4) and then start again with the first two of the drive lines (e.g. drive line X0 and X1).

In particular embodiments, as each set of drive lines is driven, a corresponding set of sense lines (not shown in FIG. 4) may be measured to determine whether a touch or proximity input has occurred and, if so, its position. The process illustrated in FIG. 4 may be similarly applied when driving three, four, or more drive lines at a time. For example, to drive three drive lines at a time, drive lines X0, X1, and X2 may be driven at the same time, each by a set of electrical pulses (e.g., four pulses); drive lines X1, X2, and X3 may then be driven at the same time, each by a set of electrical pulses; drive lines X2, X3, and X4 may then be driven at the same time by a set of electrical pulses; and so on. As another example, to drive four drive lines at a time, drive lines X0, X1, X2, and X3 may be driven at the same time, each by a set of electrical pulses (e.g., four pulses); drive lines X1, X2, X3, and X4 may be driven at the same time; drive lines X2, X3, X4, and X5 may driven at the same time by a set of electrical pulses; and so on.

Compare the processes illustrated in FIGS. 3 and 4 with each other. In both cases, the SNR of the touch sensor may depend on the voltage level of the electrical pulses that drive the drive lines and the level of the electrical noise in or near the touch sensor. Suppose that the level of the electrical noise remains unchanged. Further suppose that the voltage level of each drive pulse is the same for both cases. In the case illustrated in FIG. 3, only one drive line is driven at a time, while in the case illustrated in FIG. 4, two drive lines are driven at a time. Thus, the total voltage level for the case illustrated in FIG. 4 is approximately twice the total voltage level for the case illustrated in FIG. 3. Consequently, in particular embodiments, driving two drive lines at a time instead of one at a time may provide an approximately twofold improvement in the SNR of the touch sensor, without having to increase the voltage level of each drive pulse. Similarly, in particular embodiments, driving three drive lines at a time instead of one at a time may provide an approximately threefold improvement in the SNR of the touch sensor and driving four drive lines at a time instead of one at a time may provide an approximately fourfold improvement in the SNR of the touch sensor.

Moreover, when an object touches or comes within proximity of the touch sensor, the object may cover multiple drive or sense lines substantially simultaneously due to a size difference between the object (which may be relatively larger in size) and the individual drive and sense lines (which may be relatively smaller in size). By driving multiple drive lines at a time, particular embodiments may decrease the amount of time it may take to detect a touch as well as the amount of time it may take to measure the position of that touch. For example, suppose that when a touch or proximity input occurs, six drive lines (e.g., X0 to X5) must be driven to detect the touch or proximity input and the same six drive lines must be driven again to determine the position of the touch or proximity input. Further suppose that driving one or more drive lines at a time takes one time unit. On the one hand, in the case illustrated in FIG. 3, since the drive lines are driven one at a time, it would take six time units to detect the touch or proximity input and another six time units to determine its position. On the other hand, in the case illustrated in FIG. 4, since two drive lines are driven at a time, it would take three time units to detect the touch or proximity input and another five time units to determine its position.

Herein, reference to a computer-readable storage medium encompasses one or more non-transitory, tangible computer-readable storage media possessing structure. As an example and not by way of limitation, a computer-readable storage medium may include a semiconductor-based or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. An apparatus comprising:
   a touch sensor comprising:
      a plurality of drive lines; and
      a plurality of sense lines each adapted to capacitively couple to one or more of the plurality of drive lines; and
   one or more computer-readable non-transitory storage media coupled to the touch sensor and embodying logic that is configured when executed to:
      drive, at a first time, first and second drive lines of the plurality of drive lines, each with one or more electrical pulses, the first and second drive lines being adjacent to one another; and
      drive, at a second time and without driving the first drive line with one or more electrical pulses, the second drive line and a third drive line of the plurality of drive lines, each with one or more electrical pulses, the second and third drive lines being adjacent to one another.

2. The apparatus of claim 1, wherein the logic is configured to drive two of the drive lines at a time.

3. The apparatus of claim 1, wherein the logic is configured to drive three of the drive lines at a time.

4. The apparatus of claim 1, wherein the logic is configured to drive four of the drive lines at a time.

5. The apparatus of claim 1, wherein:
   the drive lines comprise lines 0 to n; and
   the logic is configured to drive, for each line i, where $0 \le i \le n-1$, lines i and i+1 at a same time.

6. The apparatus of claim 1, wherein:
   the drive lines comprise lines 0 to n; and
   the logic is configured to drive, for each line i, where $0 \le i \le n-2$, lines i and i+1 and i+2 at a same time.

7. The apparatus of claim 1, wherein:
   the drive lines comprise lines 0 to n; and
   the logic is configured to drive, for each line i, where $0 \le i \le n-3$, lines i and i+1 and i+2 and i+3 at a same time.

8. The apparatus of claim 1, wherein the logic is configured to drive each drive line with a set of four electrical pulses at a time.

9. A method comprising:
   driving, at a first time, first and second drive lines of a plurality of drive lines of a touch sensor, each with one or more electrical pulses, the first and second drive lines being adjacent to one another, the touch sensor comprising:
      the plurality of drive lines; and
      a plurality of sense lines each adapted to capacitively couple to one or more of the plurality of drive lines; and
   driving, at a second time and without driving the first drive line with one or more electrical pulses, the second drive line and a third drive line of the plurality of drive lines, each with one or more electrical pulses, the second and third drive lines being adjacent to one another.

10. The method of claim 9, wherein two of the drive lines are driven at a time.

11. The method of claim 9, wherein three of the drive lines are driven at a time.

12. The method of claim 9, wherein four of the drive lines are driven at a time.

13. The method of claim 9, wherein:
   the drive lines comprise lines 0 to n; and
   for each line i, where $0 \le i \le n-1$, lines i and i+1 are driven at a time.

14. The method of claim 9, wherein:
the drive lines comprise lines 0 to n; and
for each line i, where $0 \le i \le n-2$, lines i and i+1 and i+2 are driven at a time.

15. The method of claim 9, wherein:
the drive lines comprise lines 0 to n; and
for each line i, where $0 \le i \le n-3$, lines i and i+1 and i+2 and i+3 are driven at a time.

16. The method of claim 9, wherein each of the drive lines is driven with a set of four electrical pulses at a time.

17. One or more computer-readable non-transitory storage media embodying logic that is configured when executed to:
drive, at a first time, first and second drive lines of a plurality of drive lines of a touch sensor, each with one or more electrical pulses, the first and second drive lines being adjacent to one another, the touch sensor comprising:
the plurality of drive lines; and
a plurality of sense lines each adapted to capacitively couple to one or more of the plurality of drive lines; and
drive, at a second time and without driving the first drive line with one or more electrical pulses, the second drive line and a third drive line of the plurality of drive lines, each with one or more electrical pulses, the second and third drive lines being adjacent to one another.

18. The media of claim 17, wherein the logic is configured to drive two of the drive lines at a time.

19. The media of claim 17, wherein the logic is configured to drive three of the drive lines at a time.

20. The media of claim 17, wherein the logic is configured to drive four of the drive lines at a time.

21. The media of claim 17, wherein:
the drive lines comprise lines 0 to n; and
the logic is configured to drive, for each line i, where $0 \le i \le n-1$, lines i and i+1 at a same time.

22. The media of claim 17, wherein:
the drive lines comprise lines 0 to n; and
the logic is configured to drive, for each line i, where $0 \le i \le n-2$, lines i and i+1 and i+2 at a same time.

23. The media of claim 17, wherein:
the drive lines comprise lines 0 to n; and
the logic is configured to drive, for each line i, where $0 \le i \le n-3$, lines i and i+1 and i+2 and i+3 at a same time.

24. The media of claim 17, wherein the logic is configured to drive each drive line with a set of four electrical pulses at a time.

* * * * *